(12) United States Patent
Bullock et al.

(10) Patent No.: US 11,178,849 B2
(45) Date of Patent: Nov. 23, 2021

(54) PET BED

(71) Applicant: YETI Coolers, LLC, Austin, TX (US)

(72) Inventors: Dustin Bullock, Austin, TX (US); John W. Dow, Austin, TX (US); Donald Edward Desroches, Austin, TX (US); Brian Langerak, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 272 days.

(21) Appl. No.: 16/376,876

(22) Filed: Apr. 5, 2019

(65) Prior Publication Data
US 2020/0315131 A1 Oct. 8, 2020

(51) Int. Cl.
*A01K 1/035* (2006.01)
*B68G 5/00* (2006.01)

(52) U.S. Cl.
CPC .............. *A01K 1/0353* (2013.01); *B68G 5/00* (2013.01)

(58) Field of Classification Search
CPC ..... A01K 1/0353; A01K 1/0157; A01K 1/015
See application file for complete search history.

(56) References Cited

U.S. PATENT DOCUMENTS

| | | |
|---|---|---|
| 2,763,013 A | 9/1956 | Van Valkenburgh |
| 3,093,407 A | 6/1963 | Wilson |
| 3,521,328 A | 7/1970 | Bonner, Jr. |
| 4,886,697 A | 12/1989 | Perdelwitz, Jr. et al. |
| 5,107,558 A | 4/1992 | Luck |
| 5,197,411 A | 3/1993 | Schwarzenbart |
| D357,589 S | 4/1995 | Langhammer et al. |
| 5,662,065 A | 9/1997 | Bandimere et al. |
| 5,720,057 A | 2/1998 | Duncan |
| 5,765,502 A | 6/1998 | Haugh |
| 5,784,995 A | 7/1998 | Willinger |
| 6,237,531 B1 | 5/2001 | Peeples et al. |
| D451,197 S | 11/2001 | Jefferson |
| 6,468,931 B1 | 10/2002 | Reeder et al. |
| D486,877 S | 2/2004 | Peterson |
| 6,698,380 B2 | 3/2004 | Morrison |
| 6,745,419 B1 | 6/2004 | Delfs et al. |
| 6,951,035 B2 | 10/2005 | Kinchen et al. |
| 7,225,756 B2 | 6/2007 | Greenfield |
| D563,058 S | 2/2008 | Lamstein et al. |
| 7,373,900 B2 | 5/2008 | Duncan |

(Continued)

FOREIGN PATENT DOCUMENTS

| | | | |
|---|---|---|---|
| CA | 139121 A | 3/1912 | |
| CA | 154081 A | 3/1914 | |

(Continued)

OTHER PUBLICATIONS

Jul. 10, 2020—(WO) International Search Report & Written Opinion—PCT/US2020/026390.

(Continued)

*Primary Examiner* — Trinh T Nguyen
(74) *Attorney, Agent, or Firm* — Banner & Witcoff, Ltd.

(57) ABSTRACT

A pet bed is disclosed that includes a bolster and removable mattress portion. The bolster may be formed from a foam cushion, a fiber-filled cushion, a lower bolster cover, and an upper bolster cover. The upper bolster cover may comprise an upper and lower outer member such that the lower outer member connects to the lower bolster cover and separates the foam cushion from the fiber-filled cushion. The upper outer member of the upper bolster cover may cover the foam cushion.

9 Claims, 7 Drawing Sheets

(56) References Cited

U.S. PATENT DOCUMENTS

| | | |
|---|---|---|
| D571,055 S | 6/2008 | Song |
| 7,530,326 B2 | 5/2009 | Dunn et al. |
| D593,351 S | 6/2009 | Song |
| 7,614,362 B2 | 11/2009 | Dunn et al. |
| D612,547 S | 3/2010 | Zine |
| D614,363 S | 4/2010 | Song |
| 7,735,171 B2 | 6/2010 | Kan |
| 7,765,952 B1 | 8/2010 | Archibald |
| D629,164 S | 12/2010 | Lamstein et al. |
| D638,173 S | 5/2011 | Elmburg et al. |
| D638,997 S | 5/2011 | Zine-Himy |
| D640,016 S | 6/2011 | Song |
| D641,936 S | 7/2011 | Simpson et al. |
| D661,844 S | 6/2012 | Song |
| D663,096 S | 7/2012 | Grolimund |
| D664,303 S | 7/2012 | Chauncey et al. |
| 8,225,746 B2 | 7/2012 | Song |
| D674,644 S | 1/2013 | Stewart |
| D679,870 S | 4/2013 | Williams |
| 8,418,295 B2 | 4/2013 | Clark |
| 8,448,275 B1 | 5/2013 | Leach |
| 8,539,909 B2 | 9/2013 | Williams |
| D703,877 S | 4/2014 | Popkin et al. |
| 8,850,645 B1 | 10/2014 | Jackson et al. |
| 8,914,927 B1 | 12/2014 | Leach |
| D723,747 S | 3/2015 | Diskin |
| D725,832 S | 3/2015 | Coulter |
| D725,847 S | 3/2015 | Coulter |
| D731,209 S | 6/2015 | Fux |
| 9,138,066 B1 | 9/2015 | Goenka |
| D741,976 S | 10/2015 | Lagier |
| 9,167,922 B1 | 10/2015 | Holbrook et al. |
| D751,322 S | 3/2016 | Reynolds |
| D759,904 S | 6/2016 | Cantwell et al. |
| D809,715 S | 2/2018 | Song |
| D818,652 S | 5/2018 | Song |
| D821,657 S | 6/2018 | Jakubowski et al. |
| 9,986,717 B1 | 6/2018 | Diskin et al. |
| D822,910 S | 7/2018 | Pelz et al. |
| D822,911 S | 7/2018 | Menayan et al. |
| D833,687 S | 11/2018 | Song |
| D836,849 S | 12/2018 | Romaya |
| D842,555 S | 3/2019 | Chen |
| D847,528 S | 5/2019 | Furuland |
| D862,118 S | 10/2019 | Rogers et al. |
| D862,119 S | 10/2019 | Rogers et al. |
| D866,087 S | 11/2019 | Croteau-Beggs |
| D880,784 S | 4/2020 | Romaya |
| 2002/0108578 A1 | 8/2002 | Kostial |
| 2004/0134433 A1 | 7/2004 | Holder |
| 2004/0163603 A1 | 8/2004 | Newton |
| 2004/0216680 A1 | 11/2004 | Lamstein |
| 2005/0087142 A1 | 4/2005 | Dalal et al. |
| 2006/0005773 A1 | 1/2006 | Brown |
| 2006/0112888 A1 | 6/2006 | Greenfield |
| 2006/0254526 A1 | 11/2006 | Andriola |
| 2006/0272581 A1 | 12/2006 | Dunn et al. |
| 2006/0272582 A1 | 12/2006 | Dunn et al. |
| 2007/0137583 A1 | 6/2007 | Angus |
| 2012/0247393 A1 | 10/2012 | Snyder et al. |
| 2014/0060437 A1 | 3/2014 | Gryner, Jr. |
| 2014/0190417 A1 | 7/2014 | Lipscomb et al. |
| 2014/0230735 A1 | 8/2014 | Coulter |
| 2015/0237824 A1 | 8/2015 | Cantwell et al. |
| 2016/0021846 A1 | 1/2016 | Bigott |
| 2016/0106061 A1 | 4/2016 | Nelson et al. |
| 2016/0198674 A1 | 7/2016 | Younger et al. |
| 2016/0242539 A1 | 8/2016 | Paya |
| 2016/0309678 A1 | 10/2016 | Garnet |
| 2016/0324329 A1 | 11/2016 | Costantino, III et al. |
| 2017/0258036 A1 | 9/2017 | Galloway |
| 2018/0020840 A1 | 1/2018 | Auclair |
| 2018/0049399 A1 | 2/2018 | Menayan et al. |
| 2019/0029218 A1 | 1/2019 | Komatsubara |
| 2019/0313600 A1 | 10/2019 | Komatsubara |
| 2020/0037792 A1 | 2/2020 | Rogers et al. |

FOREIGN PATENT DOCUMENTS

| | | |
|---|---|---|
| CN | 202653661 U | 1/2013 |
| CN | 203095608 U | 7/2013 |
| CN | 303061401 | 12/2014 |
| CN | 204968880 U | 1/2016 |
| CN | 206760381 U | 12/2017 |
| CN | 207476590 U | 6/2018 |
| CN | 207720918 U | 8/2018 |
| DE | 1907870 A1 | 9/1970 |
| DE | 8319530 U1 | 1/1984 |
| DE | 202011104046 U1 | 10/2011 |
| DE | 202014101675 U1 | 5/2014 |
| EM | 005634300-0001 | 9/2018 |
| EP | 3459348 A4 | 6/2019 |
| GB | 2153662 A | 8/1985 |
| GB | 2482598 A | 2/2012 |
| GB | 4038546 | 1/2015 |
| GB | 6031322 | 3/2018 |
| JP | 2005253398 A | 9/2005 |
| JP | 2005253399 A | 9/2005 |
| JP | 2007174991 A | 7/2007 |
| WO | 07038511 A2 | 4/2007 |
| WO | 17130423 A1 | 8/2017 |
| WO | 17195383 A1 | 11/2017 |
| WO | 17212658 A1 | 12/2017 |

OTHER PUBLICATIONS

Laketown Furnishings, Ltd., "Renelle Flip Flop Bed 2LB Brush," 2014.

petbonito.com, "Dog House with Mat; Foldable Pet Pen; Travel Dog Bed; Pet Kennels," 2017.

Ddefoto, "Lovely Foldable Guest Mattress Picture 3 of 3 Foldable Guest Bed Mattress," Aug. 12, 2018.

amazon.com, "Weighted Logic Weighted Blanket Cover 60"×80" Duvet (Dark Grey Quilted Rhombus)," visited Jan. 16, 2019 at <https://www.amazon.com/dp/B07L2MN876/ref=sbl_dpx_B07M9CWXV9_0>.

Better Homes & Gardens, "Tahoe Gear Twin Size Mattress Bed Kit with Quilted Fitted Sheet Cover & Blanket," visited Jan. 16, 2019 at https://www.bhg.com/shop/tahoe-gear-tahoe-gear-twin-size-mattress-bed-kit-with-quilted-fitted-sheet-cover-and-blanket-p104df82e0541922aa546118d06e53c0f.html>.

eLUXURY.COM, "The Pillowtop Mattress Pad," visited Jan. 16, 2019 at <https://www.eluxury.com/products/extra-plush-mattress-pad-topper-with-fitted-skirt?variant=17082900997&gclid=EAIaIQobChMI8_qhxobz3wIVE8DlCh0fawGxEAQYCyABEgJdDPD_BwE>.

alibaba.com, "600D Oxford Pet Dog Car Back Seat Cover with Safety Belt," visited Jan. 16, 2019 at <https://www.alibaba.com/product-detail/600D-Oxford-Pet-Dog-Car-Back_60629637948.html?spm=a2700.7724857.normalList.57.36d81be0J0pqQS>.

chewy.com, "Frisco Tufted Lounger Square Dog Bed," visited Jan. 16, 2019 at <https://www.chewy.com/frisco-tufted-lounger-square-dog-bed/dp/171712?utm_source=google-product&utm_medium=cpc&utm_campaign=hg&utm_content=Frisco&utm_term=&gclid=EAIaIQobChM1mtSmuYjz3wlVV-DlCh07wQ0jEAQYHiABEgKb8vD_BwE>.

fishingtackle24.de—"Jrc Defender Flat Fold Mat," visited Jan. 16, 2019 at <https://www.fishingtackle24.de/lng/en/jrc-defender-flat-fold-mat.html>.

PET BED

TECHNICAL FIELD

This disclosure relates to a pet bed.

BACKGROUND

Pet beds provide comfortable resting places for animals such as dogs and cats. However, many of the beds may be difficult to keep clean, lose their shape over time, or develop rips or tears in the fabric, which can lead to a shortened life of the bed.

BRIEF SUMMARY

This disclosure may relate to a pet bed comprising a bolster where the bolster includes a lower bolster cover, a foam cushion positioned on the bottom member of the lower bolster cover, an upper bolster cover, and a fiber-filled cushion. The lower bolster cover may have a bottom member and a side member that extends from a perimeter of the bottom member. The lower bolster cover may also have a first closure element extending around an upper interior region of the side member and a second closure element extending around an upper exterior region of the side member. The foam cushion may include an upper surface, a lower surface, a side surface extending from the upper surface to the lower surface, and a central opening extending through the upper and lower surfaces forming an interior perimeter surface. The upper bolster cover may include a central member, an upper outer member, and a lower outer member, where the upper outer member includes a third closure element and the lower outer member includes a fourth closure element. The fourth closure element may connect to the first closure element of the lower bolster cover such that the lower outer member covers the upper surface of the foam cushion. Additionally, the fiber-filled cushion may include an upper surface, a lower surface, an outer side surface extending from the upper surface and the lower surface, and a central opening extending through the upper surface and the lower surface forming an interior perimeter surface, wherein the upper outer member covers the upper surface of the fiber-filled cushion.

Other aspects of this disclosure may relate to a pet bed having a mattress portion that is removably coupled to the pet bed. The central member of the upper bolster cover may have a quilted surface and the third closure element of the upper outer member of the upper bolster cover may connect to the second closure element of the lower bolster cover. In addition, the first and fourth closure elements may form a zippered connection between the upper bolster cover and the lower bolster cover. The lower outer member of the upper bolster cover may separate the foam cushion from the fiber-filled cushion. Additionally, the central opening of the fiber-filled cushion may be larger than the central opening of the foam cushion that forms an undercut that receives the mattress portion.

Still other aspects of this disclosure may relate to a pet bed comprising a bolster including a lower bolster cover, an upper bolster cover, a first cushion member, and a second cushion member. The lower bolster cover may have a bottom member and a side member extending from a perimeter of the bottom member, where the lower bolster cover has a first closure element extending around an upper interior region of the side member and a second closure element extending around an upper exterior region of the side member. The upper bolster cover may include a central member, an upper outer member, and a lower outer member, where the upper outer member includes a third closure element and the lower outer member includes a fourth closure element. The fourth closure element connects to the first closure element of the lower bolster cover. The first cushion member may be positioned on the bottom member of the lower bolster, where the first cushion member includes an upper surface, a lower surface, a side surface extending from the upper surface to the lower surface, and a central opening extending through the upper and lower surfaces forming an interior perimeter surface. The second cushion member may include an upper surface, a lower surface, an outer side surface extending from the upper surface and the lower surface, a side surface extending from the upper surface to the lower surface, and a central opening extending through the upper surface and the lower surface forming an interior perimeter surface. The third closure element of the upper outer member may connect to the second closure element of the lower bolster cover such that the upper outer member covers the upper surface of the second cushion member, and the lower outer member of the upper bolster cover may separate the first cushion member from the second cushion member. In addition, the mattress portion may be removably coupled to the pet bed, where the mattress portion has a quilted top surface.

Yet additional aspects of the disclosure may relate to a pet bed where the first cushion member has a different cushioning means than the second cushion member. The first closure may be positioned around an entire perimeter of the lower bolster cover. The pet bed may have a substantially rectangular shape with rounded corners. The lower bolster cover and the upper bolster cover may be separate members. In addition, the lower bolster cover may be formed from a fabric having a water-resistant layer. The central opening of the second cushion may be larger than the central opening of the first cushion forming an undercut that receives the mattress portion, such that the central opening of the second cushion member has a width that is less than a width of the central opening of the first cushion member. The second closure and the third closure may form a zippered connection around an entire perimeter of the lower bolster cover.

In further embodiments, this disclosure may relate to a pet bed comprising a bolster and a mattress portion where the bolster comprises a lower bolster cover, an upper bolster cover, a foam cushion, and a fiber-filled cushion. The lower bolster cover may have a bottom member and a side member extending from a perimeter of the bottom member, where the lower bolster cover has a first closure element extending around an entire perimeter an upper interior region of the side member and a second closure element extending around an upper exterior region of the side member. The foam cushion positioned on the bottom member of the lower bolster, wherein the foam cushion includes an upper surface, a lower surface, a side surface extending from the upper surface to the lower surface, and a central opening extending through the upper and lower surfaces forming an interior perimeter surface. The upper bolster cover may include a central member, an upper outer member, and a lower outer member, where the upper outer member includes a third closure element and the lower outer member includes a fourth closure element. The fourth closure element may connect to the first closure element of the lower bolster cover such that the lower outer member covers the upper surface of the foam cushion. The fiber-filled cushion may include an upper surface, a lower surface, an outer side surface extending from the upper surface and the lower surface, a side surface extending from the upper surface to the lower surface, and a central opening extending through the upper surface and the lower surface forming an interior perimeter surface. The third closure element of the upper outer member may connect to the second closure element of the lower bolster cover such that the upper outer member covers the upper surface of the fiber-filled cushion. The first closure element and the fourth closure element may form a zippered connection around an entire perimeter of the lower bolster cover. Additionally, a width of the central opening of the fiber-filled cushion may be larger than a width of the central opening of the foam cushion to form an undercut that receives the mattress portion that is removably coupled to the pet bed. The foam cushion may have a height that is substantially equal to a height of the fiber-filled cushion. Lastly, the second closure element and the third closure element may not be visible from the exterior of the pet bed.

BRIEF DESCRIPTION OF DRAWINGS

To allow for a more full understanding of the present disclosure, it will now be described by way of example, with reference to the accompanying drawings in which.

DETAILED DESCRIPTION

In the following description of various example structures and methods according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Nothing in this specification should be construed as requiring a specific three-dimensional orientation of structures in order to fall within the scope of this invention, unless explicitly specified by the claims. The reader is also advised that the attached drawings are not necessarily drawn to scale.

In general, this disclosure relates to a pet bed providing a place for a dog or other animal to rest, sit, or sleep. The pet bed may comprise a bolster that provides a base with a raised support walls to allow a pet to lean against and a mattress portion that provides a cushioned surface for a pet to lie on.

As shown in FIGS. 1-7B, the pet bed 100 may comprise a bolster 110 and a mattress portion 160. The bolster 110 may have a central recess 112 that is surrounded by a plurality of support walls 114. The mattress portion 160 may be positioned within the central recess 112 of the bolster 110. The support walls 114 may have a height that is greater than a height of the top surface of the mattress portion 160. The height of the support walls 114 is measured vertically from a bottom surface 116 of the bolster 110 to an uppermost surface of the support walls 114, and the height of the mattress portion 160 is measured vertically from the bottom surface 116 to the top surface of the mattress portion 160.

The bolster 110 may comprise a lower bolster cover 120, an upper bolster cover 130, a foam cushion 140, and a fiber-filled cushion 150. The lower bolster cover 120 may have a bottom member 122 that forms the bottom surface 116 of the pet bed 100 and a side member 124 that extends from a perimeter of the bottom surface 116. The side member 124 may form a portion of the exterior surface of the support walls 114 of the pet bed 100. The upper bolster cover 130 may have a central member 132 that is positioned in the central recess 112 of the bolster 110, a lower outer member 134 extending from the central member towards the perimeter of the pet bed 100, and an upper outer member 136 that forms the uppermost portion of the support walls 114 and a portion of the exterior surface of the support walls 114. The upper bolster cover 130 and the lower bolster cover 120 may connect to each other along a central region of the support wall 114.

Figure 7A:
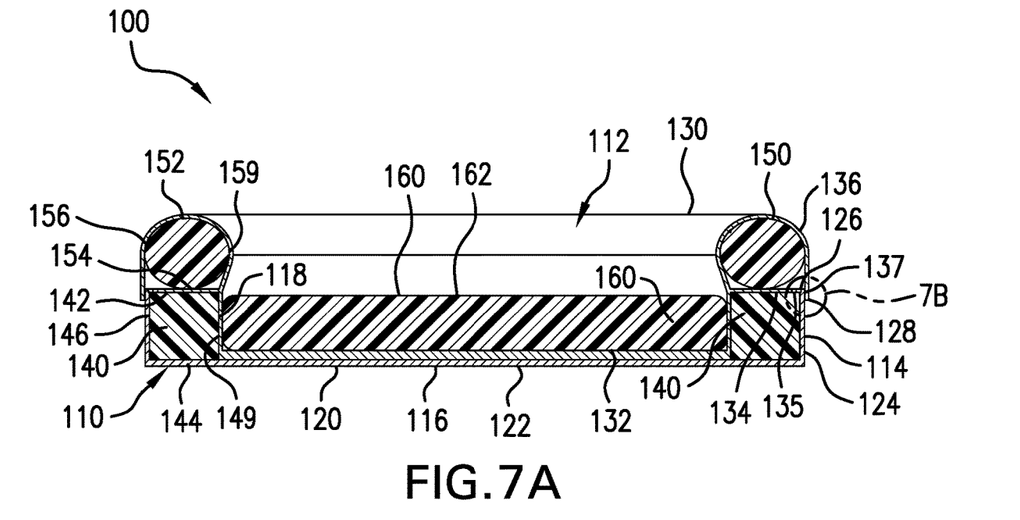
FIG. 7A depicts a side cross-sectional view of the pet bed as disclosed herein.
Figure 7B:
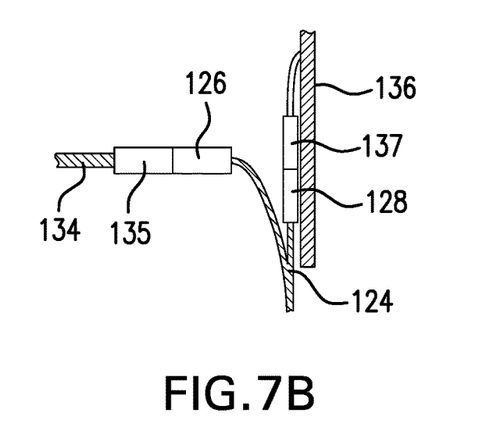
FIG. 7B depicts an enlarged view of a portion of FIG. 7A with some components removed for clarity.

The support walls 114 may include a foam cushion 140 and a fiber-filled cushion 150 to help provide structure to the support walls 114. As shown in FIG. 7A, the foam cushion 140 may be positioned on the bottom member 122 of the lower bolster cover 120, where the foam cushion 140 includes an upper surface 142, a lower surface 144, a side surface 146 extending from the upper surface 142 to the lower surface 144, and a central opening 148 extending through the upper and lower surfaces 142, 144 forming an interior perimeter surface 149. The fiber-filled cushion 150 may include an upper surface 152, a lower surface 154, an outer side surface 156 extending from the upper surface 152 and the lower surface 154, and a central opening 158 extending through the upper surface and the lower surface forming an interior perimeter surface 159. The fiber-filled cushion 150 may be arranged on top of the foam cushion 140. The lower outer member 134 of the upper bolster cover 130 may be positioned between the foam cushion 140 and the fiber-filled cushion 150 such that it substantially covers the upper surface 142 of the foam cushion 140 and separates the foam cushion 140 from the fiber-filled cushion 150. The lower outer member 134 may have a closure element 135 arranged along the outer perimeter that connects with an interior closure element 126 that is arranged on an upper interior region of the side member 124 of the lower bolster cover 120 as shown in FIG. 7B. The lower outer member 134 helps to secure the foam cushion 140 to pet bed 100 such that the foam cushion 140 provides support and shape to the lower portion of the support walls 114. In addition, the fiber-filled cushion 150 may provide support and shape to the upper portion of the support walls 114. The fiber-filled cushion 150 may be arranged on the lower outer member 134 and secured to the pet bed 100 by the upper outer member 136 of the upper bolster cover 130. The upper outer member 136 may extend from the central member 132 and surround the upper region of the fiber-filled cushion 150 and connect to the lower bolster cover 120 via a closure element 137 arranged along the outer edge of the upper outer member 136. The closure element 137 may connect to the exterior closure element 128 that is arranged on an upper exterior region of the side member 124 as shown in FIG. 7B. In addition, a portion of the upper outer member 136 may extend over the closure elements 128, 137 such that these closure elements 128, 137 are not visible when viewed by an observer from an exterior of the pet bed 100. By covering these closure elements 128, 137, the closure elements 128, 137 may be protected from the pet scratching or chewing on them to improve the durability of the pet bed 100. In addition, the closure elements 126, 135 are hidden from view and are not accessible to the pet while the bed is in an assembled state and thus are also protected from the pet scratching or chewing on them to further improve the durability of the pet bed 100.

The fiber-filled cushion 150 and foam cushion 140 may be arranged to form an undercut or recess 118 in the pet bed 100 to receive and secure a mattress portion 160 within the pet bed. 100. As discussed above, the fiber-filled cushion 150 may be arranged on top of the foam cushion 140. The fiber-filled cushion 150 may have a central opening 158, and the foam cushion 140 may have a central opening 148. The central opening 158 of the fiber-filled cushion 150 may have a width and length that is less than the corresponding width and length of the central opening 148 of the foam cushion 140. The different sized central openings 148, 158 create a recess 118 around the inner portion of the pet bed 100. The recess 118 receives the mattress portion 160 such that the lower portion of the fiber-filled cushion 150 helps to retain the mattress portion 160 in the pet bed 100. The mattress portion 160 rests on top surface of the central member 132 of the upper bolster cover 120. The overhang of the fiber-filled cushion 150 that creates the undercut 118 may vertically restrain the mattress 160 from being accidentally removed. However, because of the flexibility of the fiber-filled cushion 150 and the mattress portion 160, the mattress portion 160 may be removably coupled to the pet bed 100 such that it may be removed by the user. In some instances, the mattress portion 160 may be used separately from the bolster 110 such as a travel bed.

The closure elements 126, 128 of the lower bolster cover 120 and the closure elements 135, 137 of the upper bolster cover 130 may be complementary closure elements, such that the closure elements 126, 135 fit together to join the lower outer member 134 of lower bolster cover 120 to the upper bolster cover 130 and closure elements 128, 137 fit together to join the upper outer member 136 to the upper bolster cover 130. In addition, these closure elements 126, 128, 135, 137 may be arranged around an entire perimeter of the lower bolster cover 120 and upper bolster cover 130 such that they fully encircle (360 degrees) around the pet bed 100. Alternatively, in some embodiments, the closure elements 126, 128, 135, 137 may be arranged around a portion of the perimeter of the lower bolster cover 120 and upper bolster cover 130. These closure elements 126, 128, 135, 137 may be zippered elements, hook and loop elements, a plurality of snaps, buttons, or other types of closure elements known to one skilled in the art. As shown in the exemplary embodiment, the closure element 126 of the lower bolster cover 120 may connect with the closure element 135 of the upper closure element may form a first zippered connection between the lower bolster cover 120 and the upper bolster cover 130. Similarly, the closure element 128 of the lower bolster cover 120 may connect with the closure element 137 of the upper bolster cover 130 to form a second zippered connection between the lower bolster cover 120 and the upper bolster cover 130 around an entire perimeter of the pet bed 100. The closure elements 126, 128, 135, 137 may create releasable connections such that the bolster covers 120, 130 may be removed by a user when necessary such as when the covers 120, 130 need to be washed. Further, the lower bolster cover 120 may be a separate member that is releasably connected to the upper bolster cover 130, although in some embodiments, the lower bolster cover 120 and upper bolster cover 130 may be permanently connected at a region along the perimeter of the lower bolster cover 120.

Figure 8:
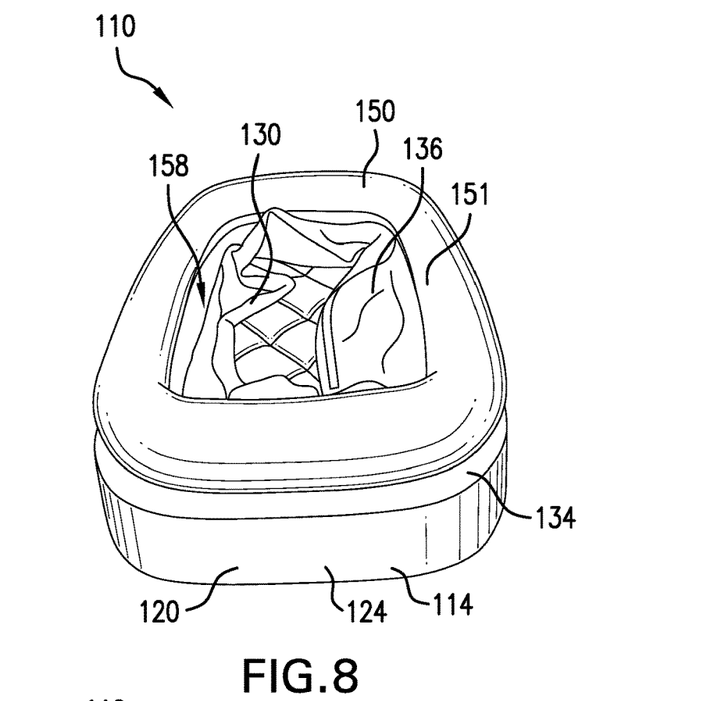
FIG. 8 depicts a perspective view of a partially assembled bolster of the pet bed of FIG. 1 as disclosed herein.
Figure 9:
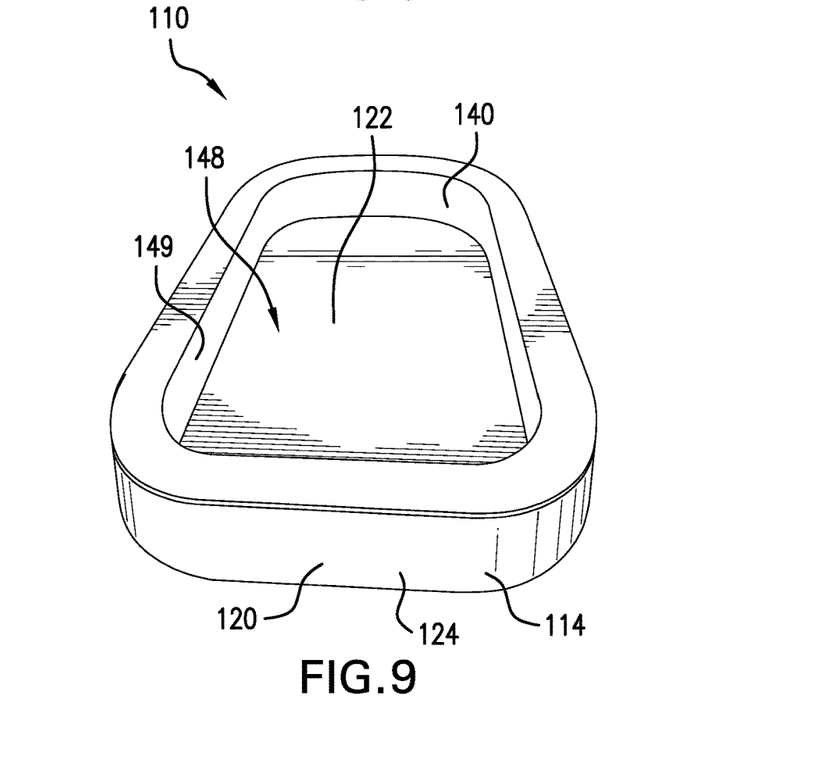
FIG. 9 depicts a perspective view of a partially assembled bolster of the pet bed of FIG. 1 as disclosed herein.
Figure 10:
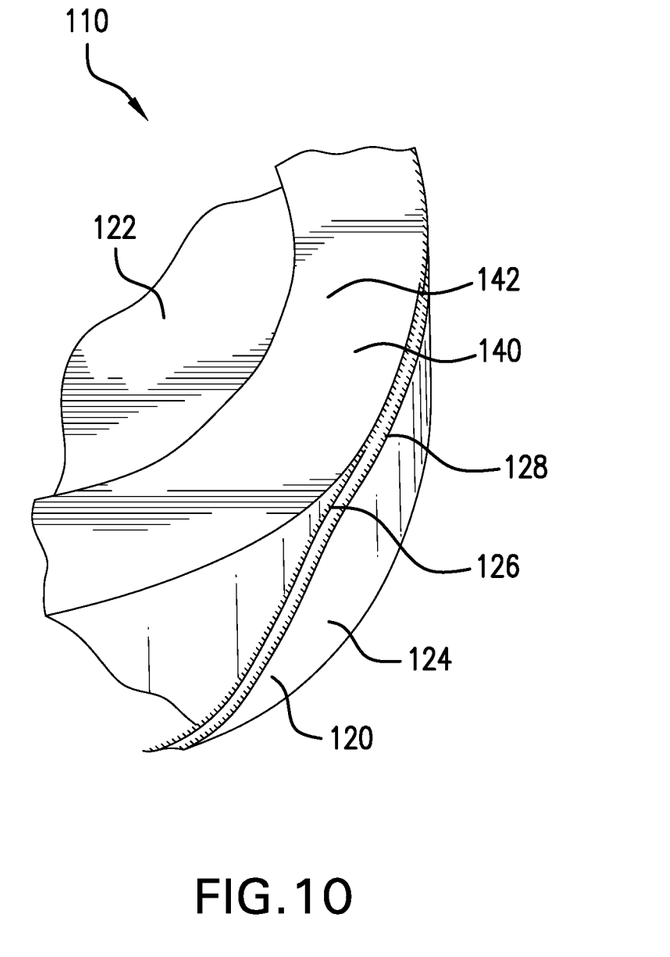
FIG. 10 depicts an enlarged perspective view of the partially assembled bolster of FIG. 9 as disclosed herein.

FIGS. 8-10 further illustrate a partially assembled bolster. FIG. 8 illustrates a partially assembled bolster 110 where the lower outer cover 134 of the upper bolster cover 130 has been attached to the lower bolster cover 120 via closure elements 135, 126. The fiber-filled cushion 150 is positioned directly on top of the lower outer cover 134 and prior to the upper outer cover 136 being extended around the fiber-filled member and attached to the lower bolster cover 120. As shown in the exemplary embodiment, the fiber-filled cushion 150 may be formed as a single continuous, or unitary, member that has a generally rectangular shape with rounded corners and a generally rectangular opening 158, while in some embodiments the fiber-filled cushion 150 may be formed from a plurality of members. FIG. 9 illustrates a partially assembled bolster 110 with the foam cushion 140 positioned on the bottom member 122 of the lower bolster cover 120. The foam cushion 140 may help shape the lower bolster cover 120 and have a height substantially similar to the height of the side member 124. In the exemplary illustrated embodiment, the foam cushion 140 may be formed as a single continuous, or unitary, member that has a generally rectangular shape with rounded corners and a generally rectangular opening 148, while in some embodiments the foam cushion 150 may be formed from a plurality of members. FIG. 10 illustrates an enlarged view of the lower bolster cover and the interior closure element 126 and the exterior closure element 128.

Figure 1:
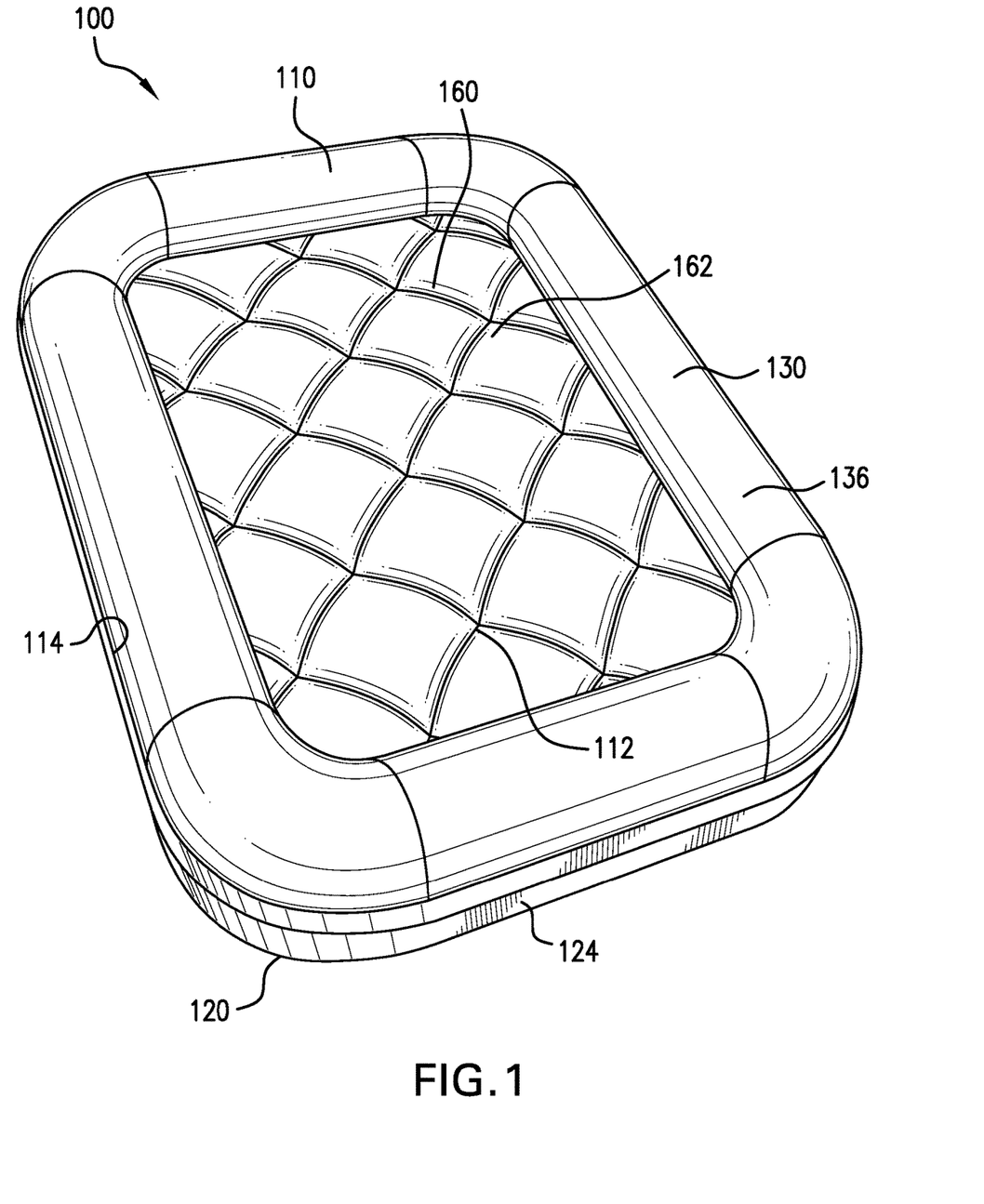
FIG. 1 depicts a perspective view of a pet bed as disclosed herein.
Figure 2:
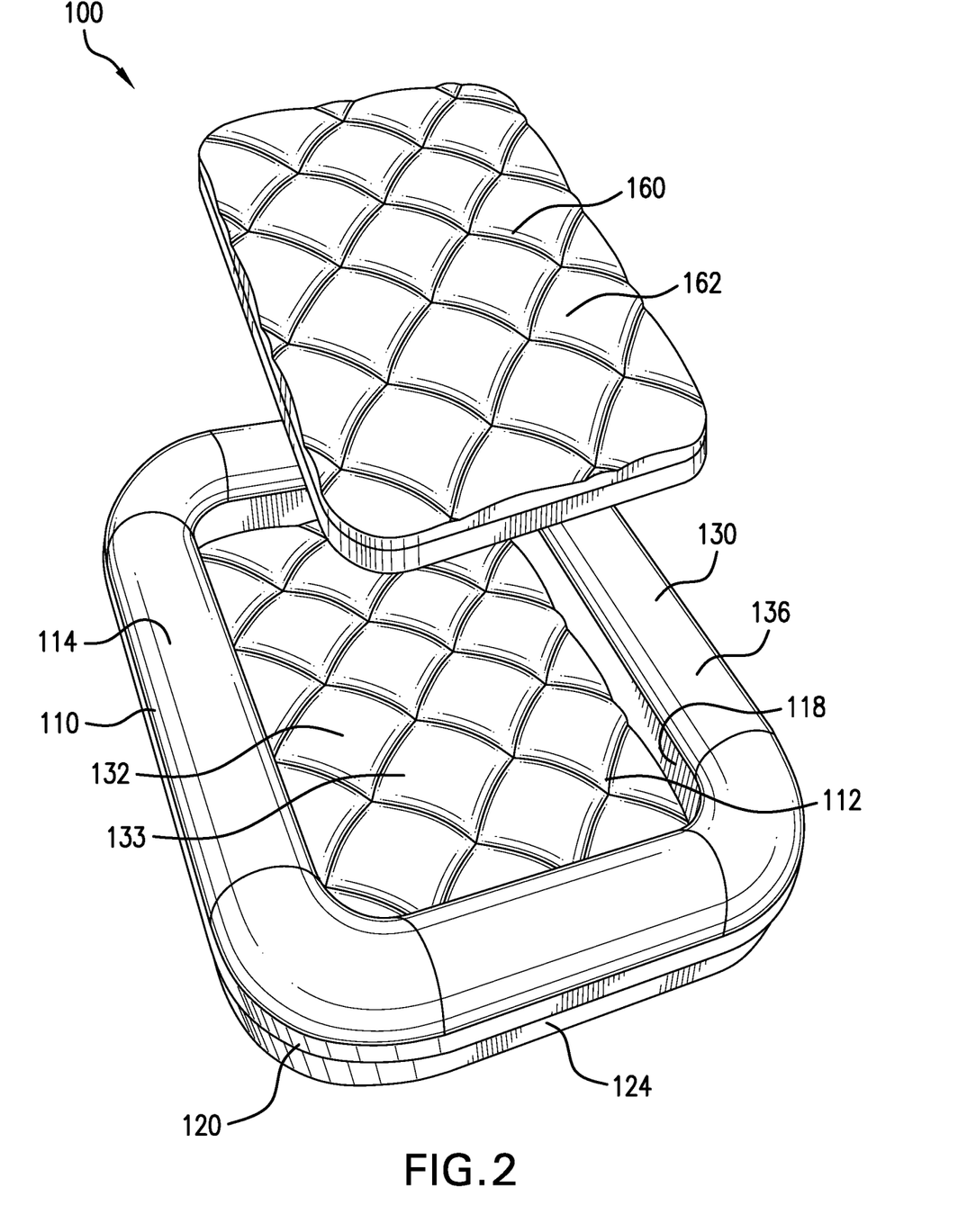
FIG. 2 depicts an exploded perspective view of the pet bed of FIG. 1 as disclosed herein.
Figure 3:
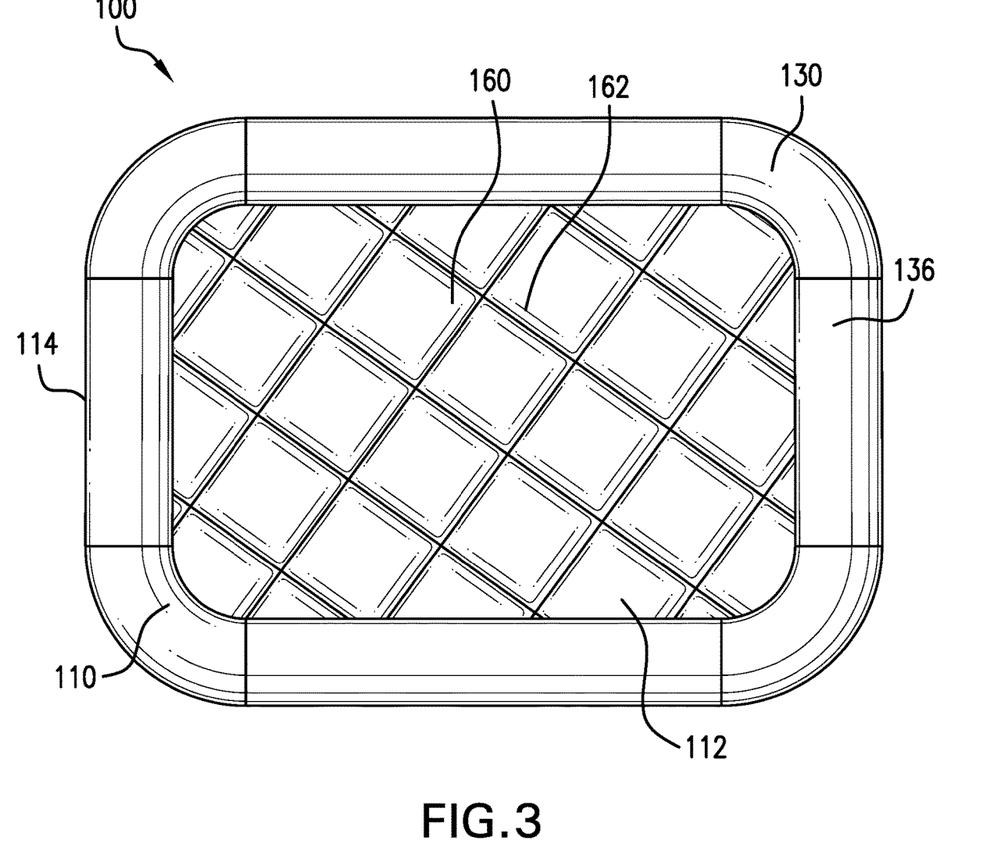
FIG. 3 depicts a top view of the pet bed as disclosed herein.
Figure 4:
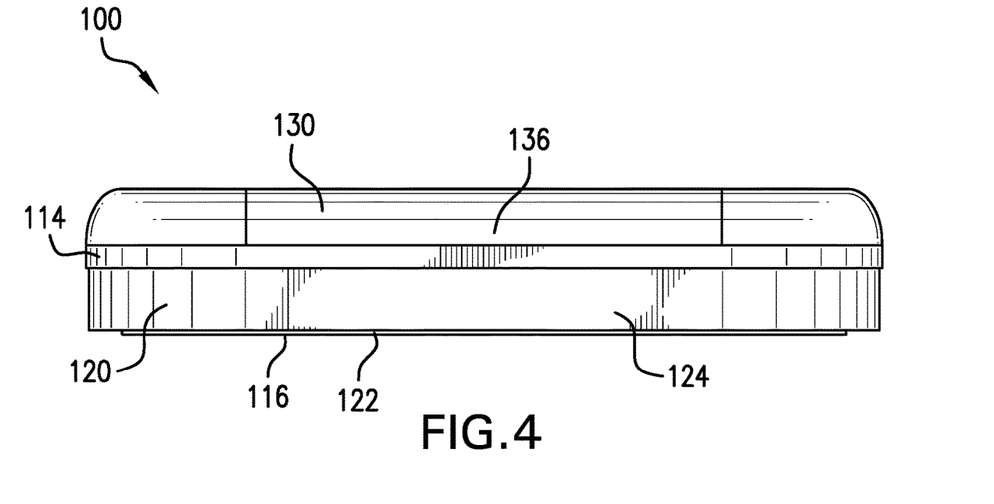
FIG. 4 depicts a front side view of the pet bed as disclosed herein.
Figure 5:
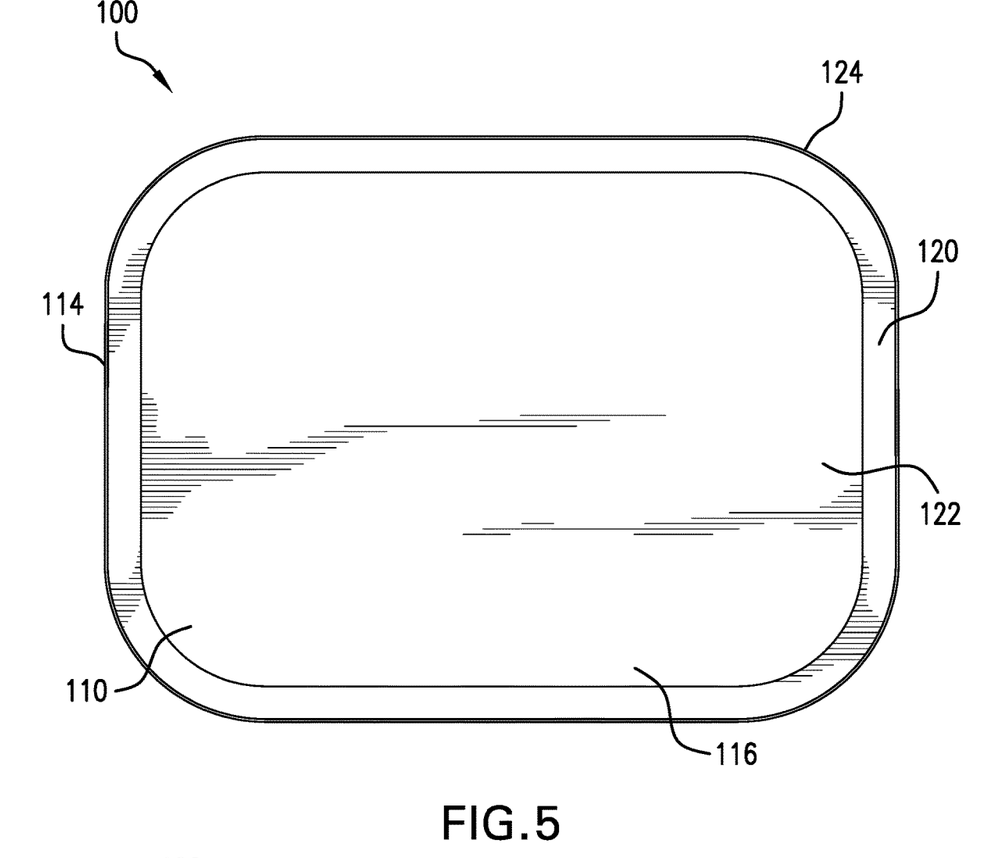
FIG. 5 depicts a bottom view of the pet bed as disclosed herein.
Figure 6:
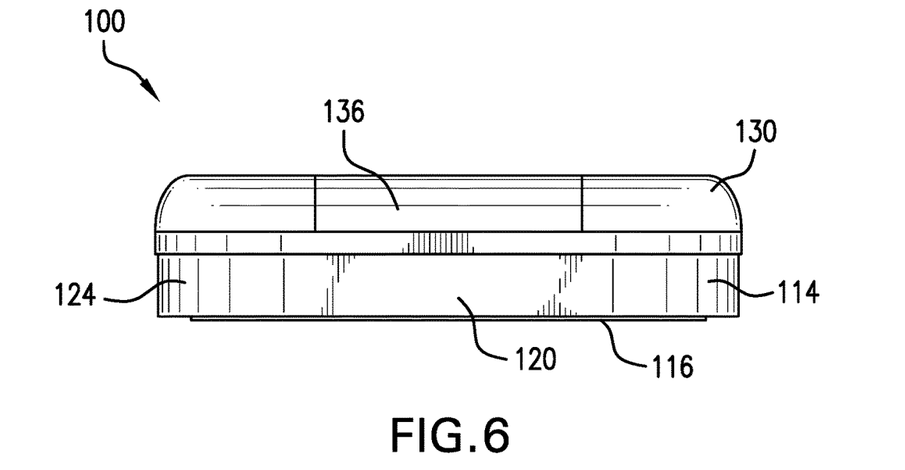
FIG. 6 depicts a left side view of the pet bed as disclosed herein.

As shown in FIGS. 1-3, the pet bed 100 may have a substantially rectangular shape with rounded corners. In some embodiments, the pet bed 100 may have any shape such as a square shape, a circular shape, an elliptical shape, or other geometric shape. The upper portions of the support walls 114 may have a substantially rounded shape. As shown in the exemplary embodiment, the support walls 114 may all have the same height, while in some embodiments the support walls 114 may have different heights. For example, one of the support walls 114 may have a height that is less than the remaining support walls 114 or alternatively, one of the support walls 114 may have a height that is greater than the remaining support walls 114. In addition, the bed 100 may have an overall height of approximately 22 cm, or within a range of 16 cm and 30 cm, an overall length of approximately 102 cm, or within a range of 60 cm and 120 cm, and an overall width of approximately 76 cm, or within a range of 45 cm and 90 cm.

The mattress portion 160 may provide the primary resting surface for the pet. The mattress portion 160 may have a substantially rectangular shape and be substantially the same size as the central opening 148 of the foam cushion 140. In other embodiments, the mattress portion 160 may have a different shape, such as a circular shape, a square shape, or an elliptical shape. The mattress portion 160 have a mattress cover 162 and a foam portion that may be formed of a single foam layer or optionally as a plurality of foam layers that are permanently joined together. For example, the multiple foam layers may comprise a central layer formed from a higher density foam than the foam layers forming the top and bottom layers. The foam layer(s) may be formed from a polyurethane material or other suitable material known to one skilled in the art. Additionally, the mattress portion 160 may have a height that is less than or equal to the height of the foam cushion 140. The mattress cover 162 may have a top surface with a quilted region, where the quilted region has polyurethane foam, polyester fiberfill, or similar materials enclosed within the quilted pattern to provide an extra layer of cushioning. In addition, the mattress cover 162 may be releasably secured around the foam portion of the mattress 160 such that it may be removed when necessary such as needing to be washed.

The fiber-filled cushion 150 may have an outer fabric cover 151 and may be filled with a polyester fiberfill material to provide a softer and more compressible member than the foam cushion 140. As shown in the exemplary embodiment of FIG. 7A, the fiber-filled cushion 150 may have a substantially elliptical cross-sectional shape. In other embodiments, the fiber-filled cushion 150 may has a circular cross-sectional shape, or other geometric cross-sectional shape. The foam cushion 140 may comprise a foam construction. In some embodiments, the foam cushion 140 may be formed of a single foam layer or optionally as a plurality of foam layers that are permanently joined together. For example, the multiple foam layers may comprise a central layer formed from a higher density foam than the foam layers forming the top and bottom layers. The foam layer(s) may be formed from a polyurethane material or other suitable material known to one skilled in the art. The foam cushion 140 may have a different cross-sectional shape than the cross-sectional shape of the fiber-filled cushion 150. As illustrated in the exemplary embodiment shown in FIG. 7A, the foam cushion 140 may have a substantially rectangular cross-sectional shape, and may have a square cross-sectional shape or other geometric cross-sectional shape. In the exemplary embodiment, the foam cushion 140 may have a height that is equal to the height of the fiber-filled cushion 150. In some embodiments the foam cushion 140 may have a height that is less than or greater than the fiber-filled cushion 150. As described above, the foam cushion 140 may have a different cushioning means than the fiber-filled cushion 150. Alternatively, the foam cushion 140 may have the same cushioning means as the fiber-filled cushion, whether both cushioning member 140, 150 comprise foam or fiberfill cushioning.

The upper bolster cover 130, lower bolster cover 120, and the mattress cover 162 may be formed from a fabric that comprises natural or synthetic fibers. For instance, the upper bolster cover 130 may include a fabric formed from a nylon or polyester fiber and may also have a fabric formed from a nonwoven material. In some embodiments, the upper bolster cover 130, lower bolster cover 120, and the mattress cover 162 may have a layered construction of multiple fabrics that are joined together through stitching, bonding, or other means known to one skilled in the art. In addition, the central member 132 of the upper bolster cover 130 may have a quilted region 133 on the top surface, where the quilted region has polyurethane foam portions enclosed within the top surface. The fabric elements of the upper bolster cover 130, lower bolster cover 120, and mattress cover 162 may also include a waterproof or water-resistant layer, such as a polyurethane or similar coating to protect any moisture from penetrating through the covers 120, 130, 164. In some embodiments, the bottom surface 122 of the lower bolster cover may have a waterproof coating to allow the bed 100 to be placed on a wet surface, such as a boat, wet grass or sand, to not allow moisture to penetrate through the bottom surface 122. For example, the bottom surface 122 may have coating formed from a molded rubber or elastomeric polymer material, such as ethylene vinyl acetate (EVA) or thermoplastic polyurethane (TPU). The coating may have a thickness of approximately 3 mm thick, or have a thickness within a range of 1 mm and 5 mm. In further embodiments, the waterproof coating may have a logo or other decorative marking molded into it. The quilted region 133 may have the same spacing between the quilted squares as the top surface 162 of the mattress portion 160.

While various embodiments have been described, it will be apparent to those of ordinary skill in the art that many more embodiments and implementations are possible that are within the scope of the claims. The various dimensions described above are merely exemplary and may be changed as necessary. Accordingly, it will be apparent to those of ordinary skill in the art that many more embodiments and implementations are possible that are within the scope of the claims. Therefore, the embodiments described are only provided to aid in understanding the claims and do not limit the scope of the claims.

We claim:

1. A pet bed comprising:
    a bolster comprising:
        a lower bolster cover having a bottom member and a side member extending from a perimeter of the bottom member, wherein the lower bolster cover has a first closure element extending around an upper interior region of the side member and a second closure element extending around an upper exterior region of the side member,
        a foam cushion positioned on the bottom member of the lower bolster cover, wherein the foam cushion includes an upper surface, a lower surface, a side surface extending from the upper surface to the lower surface, and a central opening extending through the upper and lower surfaces forming an interior perimeter surface,
        an upper bolster cover including a central member, an upper outer member, and a lower outer member, wherein the upper outer member includes a third closure element and the lower outer member includes a fourth closure element, wherein the fourth closure element of the upper bolster cover connects to the first closure element of the lower bolster cover,
        a fiber-filled cushion including an upper surface, a lower surface, an outer side surface extending from the upper surface and the lower surface, and a central opening extending through the upper surface and the lower surface forming an interior perimeter surface,
        wherein the third closure element of the upper outer member connects to the second closure element of the lower bolster cover such that the upper outer member covers the upper surface of the fiber-filled cushion, and the lower outer member of the upper bolster cover separates the foam cushion from the fiber-filled cushion, and
    a mattress portion that is removably coupled to the bolster, wherein the mattress portion has a quilted top surface.

2. The pet bed of claim 1, wherein the foam cushion has a different cushioning means than the fiber-filled cushion.

3. The pet bed of claim 1, wherein the first closure element is positioned around an entire perimeter of the lower bolster cover.

4. The pet bed of claim 1, wherein the bottom member has a waterproof coating having a thickness within a range of 1 mm and 5 mm.

5. The pet bed of claim 1, wherein the lower bolster cover and the upper bolster cover are separate members.

6. The pet bed of claim 1, wherein the central opening of the fiber-filled cushion is smaller than the central opening of the foam cushion forming an undercut that receives the mattress portion.

7. The pet bed of claim 1, wherein the upper bolster cover is formed from a fabric having a water-resistant layer.

8. The pet bed of claim 1, wherein the second closure element of the lower bolster cover and the third closure element of the upper bolster cover connect to form a zippered connection around an entire perimeter of the lower bolster cover.

9. The pet bed of claim 1, wherein the central opening of the fiber-filled cushion has a width that is less than a width of the central opening of the foam cushion.

* * * * *